United States Patent [19]

Goldfarb

[11] 4,358,278
[45] Nov. 9, 1982

[54] LEARNING AND MATCHING APPARATUS AND METHOD

[76] Inventor: Adolph E. Goldfarb, 4614 Monarca Dr., Tarzana, Calif. 91356

[21] Appl. No.: 124,316

[22] Filed: Feb. 25, 1980

[51] Int. Cl.³ .............................................. G09B 7/02
[52] U.S. Cl. .................................... 434/337; 434/169; 434/227
[58] Field of Search .............. 434/324, 325, 335, 337, 434/344, 169, 201, 202, 227

[56] References Cited

U.S. PATENT DOCUMENTS

| | | | |
|---|---|---|---|
| 3,052,041 | 9/1962 | Luxton et al. | 434/325 |
| 3,508,349 | 4/1970 | Gilden et al. | 434/335 |
| 3,666,872 | 5/1972 | Powell et al. | 434/325 X |
| 3,729,836 | 5/1973 | Mayeda | 434/335 |
| 4,055,907 | 11/1977 | Henson | 434/335 X |
| 4,075,465 | 2/1978 | Funk et al. | 434/227 X |

*Primary Examiner*—William H. Grieb

*Attorney, Agent, or Firm*—Romney, Golant, Martin, Disner & Ashen

[57] ABSTRACT

An electronic learning apparatus and methodology is disclosed wherein answer codes to a plurality of questions or tasks are disposed on the periphery of a disc. The answer codes are photo-optically read from the periphery of the disc as the disc is rotated with the answer thus read being stored in a register. The user inputs a student's answer through a keyboard into a second register. The answer code as read from the disc is compared to the keyed answer from the user to give an indication of correctness or error. The invention also includes a method for teaching arithmetic operations wherein the user must input the nature of the arithmetic operation as well as the result in order to complete the questions. The invention is also characterized in that the keyboard is adapted to be combined with a plurality of keyboard overlays whereby an arbitrary number of associations may be made between the fixed number of keys and an indefinite number of response types.

4 Claims, 7 Drawing Figures

LEARNING AND MATCHING APPARATUS AND METHOD

FIELD OF THE INVENTION

The present invention relates generally to play apparatus and method for facilitating learning, and more particularly to such apparatus and method wherein a child is encouraged to match a particular image frame with a particular sequence of keyboard strokes.

BACKGROUND OF THE INVENTION

Complex and expensive computerized learning systems designed for use in the classroom are known in which each student is provided with a console equipped with a typewriter-like key board for inputting data to the computer and with a cathode ray screen for displaying data output from the computer. Such systems conventionally operated under the control of a stored software program associated with a large general purpose digital computer. If, for instance, such a system was preprogrammed to teach mathematics, each student would be presented with mathematical problems for which he would have to type out the respective answers thereof on his keyboard and, depending upon whether or not his answer was "correct", he would either advance to a new lesson or repeat previous lesson material.

There have also been available so-called programmed text books in which a student is presented with a succession of printed multiple choice questions and, depending upon which of two or three choices he believed to be correct, he would be directed to different pages of the book associated with different lesson modules.

Computerized information retrieval systems are also known wherein, in response to the manual entry of a plurality of index numbers, key words, or other identification data by means of a keyboard at a user terminal connected to a large digital computer, relevant information stored in the computer's "data bank" is then displayed upon the terminal's cathode ray tube in the order of its apparent relevance.

However, such prior art computerized instruction schemes and such prior art computerized information retrieval schemes were generally speaking, designed for very specific purposes; moreover, such systems required large general purpose digital computers to operate the associated user keyboards and data terminals and cathode ray displays, and to store the required software, instructional text, and computerized data bases.

Programmed instruction books have the shortcoming that they are much more bulky than conventional books, with many of their pages containing material that the average student would never see as he advance through the preprogrammed lesson plan, and other pages having but a line or two of relevant instructional material.

Furthermore, none of the above described prior art programmed instruction or information retrieval systems combined matching and learning in a way that was calculated to retain the interest of the younger student such a child of pre-school age for any extended period of time.

There has also been known play apparatus designed for use by small children and provided with a wind-up motor, nine numerical keys corresponding to the digits 1 through 9, an "=" key and a window. When the motor is wound up, one of the numerical keys depressed and then the "=" key depressed, a corresponding number of images is revealed in the window.

Another type of play apparatus intended for young children contained a pre-recorded sound recording having a plurality of tracks. When a pointer was turned to a particular one of a plurality of pictorial images and the apparatus activated, a phrase corresponding to that image would be heard.

Such prior art play apparatus lacked the versatility and capability to teach any but the most simple concepts.

Accordingly, a broad objective of the present invention is to provide matching/learning apparatus that will retain a student's interest for a prolonged period of time.

A second broad objective of the present invention is to provide a method of instruction wherein the student learns to match a particular image frame with a particular sequence of input keys and thereby learn concepts of various difficulty.

A more specific objective of the present invention is to provide a new and useful apparatus and method whereby a child or other student is presented with a set of images corresponding to common objects and with a keyboard marked with the letters of the alphabet and is encouraged to associate each particular image with a particular sequence of letters of the alphabet by learning to match each such image with a particular sequence of letters thereby learning to spell.

A further objective of the present invention is to provide a method and apparatus for teaching a child basic concepts of grammar by encouraging the child to associate with each of a plurality of different images, a different particular grammatical phrase or sentence formed by the sequential operation of appropriately identified keys.

Another objective of the present invention is to assist and encourage a student to learn historical, geographical and other information of an educational nature by encouraging the student to match a frame bearing a pictorial image related to particular facts such as locations, events, time periods, personalities, causes and/or effects with the operation of the "correct" sequence of keys defining one or more of such related facts.

Another objective of the present invention is to provide a new and useful method and apparatus for encouraging a student to learn to match a visual symbol with a corresponding verbal phrase by repeatedly attempting to match an image frame bearing a particular symbol with the particular sequence of keys on a keyboard which corresponds to the "correct" phrase, each individual key being associated with a letter, particular sequence of letters, word or phrase in accordance with the designation indicated on a keyboard overlay.

Still another objective of the present invention is to provide new and useful learning and matching apparatus for reading data from a data area physically associated with a particular image frame and for comparing such data with a sequence of manually input keyboard data to determine whether or not the manually input data correctly corresponds to said particular image frame.

Another more specific objective of the present invention is to provide apparatus of the type described wherein the comparison between the image frame data and the keyboard data may be made after the student has completed entering such manual keyboard data.

Yet another specific objective of the present invention is to provide apparatus of the type described wherein "intermediate" comparisons may be made as each additional key character is depressed by the student, thereby assisting the student in locating a "correct" sequence of keys.

Yet another specific objective of the present invention is to provide apparatus wherein in response to a single input of manual data comprising a sequence of key strokes, the machine may compare such manual data with a succession of different encoded data associated with different image frames.

Yet another specific objective of the present invention is to provide matching/learning apparatus wherein the particular image frame to be matched by the student's manual keyboard input is selected at random from a plurality of image frames.

An objective of the present invention related to the foregoing is to provide apparatus having a display window for displaying a particular image frame included within a set of image frames related to a given subject and having a keyboard provided with an overlay also related to said given subject.

Yet another related objective of the present invention is to provide apparatus wherein a particular set of image frames relating to a particular subject and a corresponding keyboard overlay may be removed from the apparatus and replaced with a different set of image frames relating to a different subject and a different corresponding keyboard overlay.

BRIEF SUMMARY OF THE DISCLOSURE

The above-mentioned objectives (and other similar or otherwise related objectives which will become apparent upon reading the Detailed Description of a preferred embodiment which follows, and the Figures and Tables referenced therein), are jointly and severally achieved and satisfied in a presently preferred embodiment which may be briefly summarized as follows:

A presently preferred embodiment is adapted to be operated in two quite dissimilar manners which, nevertheless, may be effectively combined in a single embodiment of the apparatus to add additional variety and interest to the matching/learning process. The first is the "MACHINE-INITIATED" manner, wherein a particular image frame bearing a visually perceivable image is selected and located behind a display window included as part of the apparatus, and the student then attempts to input data which he believes correctly corresponds with the image displayed, whereupon the apparatus then informs the student whether the data input of the student was a "correct" answer as dictated by data in machine-readable encoded form that had previously been associated physically with the particular image frame, as, for example, by printing said data in optically readable format adjacent said frame.

The second such manner of operation of such a preferred embodiment is the "STUDENT-INITIATED", in which the student manually enters his input data, which is then stored by the apparatus and compared with the data encoded in the data areas associated with their respective image frames. If the machine detects a correct match, a visible indication of such fact is given the student and the frame associated with the encoded data matching the data input by the student remains displayed in the apparatus' display window.

In addition to manners of operation, the described preferred embodiment is also capable of selectively operating in one of two modes. In the first mode, the machine waits until the data input from the student is complete, and then compares in their entirety the encoded data associated with a particular visual frame with the data input by the student. The match must be exact for a "Yes" output, otherwise the output is "No". It doesn't matter whether the match differs by just one digit of a single character, or whether the right keys were pressed in the wrong sequence, or if there was absolutely no relationship between the encoded data and the data input by the student.

In the second mode, a new comparison is made every time the student increments each individual character in his input data by means of a single depression of a key of the keyboard, and the student is informed whether or not that character matches the corresponding character of the encoded data associated with a particular image frame. If the match is not exact, the student is given the opportunity to attempt to correct the last character input until a correct match is obtained, the machine indicating after each attempted input of a single character whether such input resulted in a good match or a bad match.

The above-described manners and modes of operation and related functions are implemented, according to one presently preferred embodiment, in apparatus having a base upon which is mounted, in a generally planar array, a keyboard designed to accommodate various keyboard overlays and having sufficient individual key areas that each letter of the English alphabet may be input by means of depression of an individual key, said apparatus also being provided with a display window adjacent said keyboard wherein different visually perceptible images may be displayed to the student using the keyboard.

In the described preferred embodiment, a learning disk holding several frames, each provided with its associated data area wherein related encoded data in optically readable format may be positioned, is utilized. Such a preferred embodiment may accordingly be conveniently provided with means for automatically revolving said learning disk so that successive ones of said image frames are successively displayed in said window, and with an optical data reader positioned facing the learning disk near its periphery so that clock marks, data marks, and position marks located in concentric tracks about the disk's periphery may be automatically converted to electric signals for controlling the operation of the machine.

The described embodiment is also provided with two serial input shift registers (one for each data track on the disk) for storing the encoded data associated with the image frame presently behind a display window, with a plurality of data registers for storing the respective data characters manually input by the student by means of said keyboard, and with comparison circuitry for comparing the data stored in the serial input shift registers with the data contained in the manual input data registers, the comparison operation being selectively performed either one character at a time (mode "2"), or the encoded data input in its entirety with the manual data input in its entirety (mode "1").

The described embodiment is further provided with means for causing the learning disk to commence revolution and to stop with a randomly selected image frame visible through the display window, or if manual data has previously been input, to stop at the image frame (if it exists) corresponding with such manually input data showing through said window.

An alternative embodiment is also disclosed wherein the automatically controlled multi-frame learning disk of the first preferred embodiment has been replaced with a manually positionable rectangular card which may have either a single image frame and a single associated encoded data area or a plurality of image frames and a corresponding plurality of associated data areas.

BRIEF DESCRIPTION OF THE DRAWINGS

For a better understanding of the present invention, reference is made to the Detailed Description of a presently preferred embodiment thereof and to the appended Figures in which.

Reference is also made to the following tables which are contained within the body of said detailed description:

Table 1 is a sequential listing of binary numbers 00000 through 11111 and an exemplary set of decimal and alphabetic decoded equivalents.

Table 2 shows how the word "elephant" may be encoded using the binary code of Table 1.

DETAILED DESCRIPTION

Figures 1, 2:
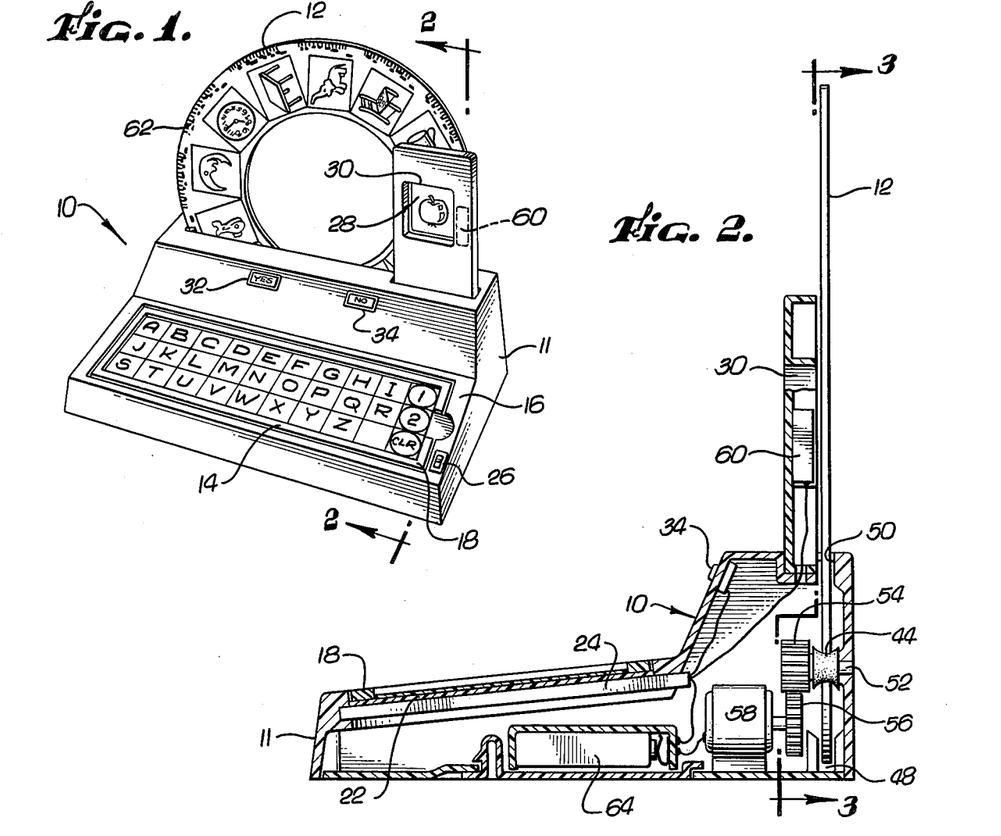
FIG. 1 is a perspective view of apparatus embodying the apparatus aspects of the present invention, with a learning disc and associated keyboard overlay in place.
FIG. 2 is a cross-section through the apparatus of FIG. 1 at the point indicated by the line 2—2 of FIG. 1.

Referring now with particularity to FIG. 1 of the drawings which shows in perspective view a preferred embodiment of apparatus for satisfying the various objectives of the present invention, it may be seen that the apparatus illustrated comprises a housing designated generally by the reference numeral 10, a so-called "teaching" disk indicated by the reference numeral 12, and a keyboard overlay indicated by the reference numeral 14b In order to give further flexibility to the apparatus, teaching disk 12 and keyboard overlay 14 are made removable so that they may be interchanged with other such disks and overlays. However, the apparatus could also be constructed with the teaching disk and the keyboard overlay permanently mounted in position. Alternatively, other functionally equivalent structure could be substituted for said teaching disk 12 and/or for said overlay keyboard overlay 14 without departing from the spirit of the present invention, as will become more clear hereinafter.

Referring now specifically to the housing 10 shown in perspective in FIG. 1 and in cross-section in FIG. 2, it may be seen that said housing comprises a base portion 11 having a slightly downwardly inclined generally planar keyboard surface 16 defining a projecting rectangular frame 18 provided with a finger depression at its right end by means of which said keyboard overlay 14 may be readily grasped and removed. Alternatively, frame 18 could be provided with more or less horizontal slots projecting inwardly along its two longer edges for holding the corresponding edges of overlay 14 more firmly in position (but perhaps less convenient to remove) than the drop-in arrangement shown in the drawings, or the frame could be a separate piece permanently attached to the removeable overlay.

Said keyboard overlay when in position is directly above a pressure sensitive ten by three matrix contact array 22 permanently mounted to an electrical printed circuit board assembly 24.

The electrical and mechanical construction of the matrix switch assembly 22 may be quite conventional and will not be described in any great detail hereinafter. For the present purposes, it should suffice to remark that the depressing a particular one of the thirty distinct areas corresponding to the three horizontal rows each containing ten elements square of overlay 14 thereabove labeled respectively "A, B, C . . . Z, space, 1, 2, CLR" results in the closure of a different pair of electrical contacts, one of the contacts corresponding to the row, the other of the contacts corresponding to the particular column within the row. Conventional matrix scanning and encoding logic may then be utilized to generate a different five-bit digital word each time a different one of the aforementioned thirty distinct pairs of the matrix switch is depressed. Alternatively, each of said thirty distinct areas may have its own electrical switching element having six electrical contacts (corresponding to the five bits of output plus a common input) and the keyboard may thus be of the so-called self-encoding type wherein the required combination of 1's and 0's forming a separate and distinct five-bit output word for each separate area (five bits sufficing to define thirty two different binary words) is directly output by the keyboard matrix switch assembly without any external distinct logic being required.

Although shown in the drawings as a single rectangular sheet of flexible plastic material having the letters of the alphabet or other keyboard designations printed on one surface thereof, the overlay 14 may alternatively be of the type having flexible portions directly over the active switch areas separated by rigid portions, whereby the child or student using the apparatus is prevented from depressing the area of the matrix switch layer between two defined active areas with a possible erroneous signal resulting (i.e. the student's input being encoded as a "P" when he actually meant to press the letter "Q").

Additionally, the apparatus may be provided with a loudspeaker or other sound transducer (not shown in the figures) connected to the keyboard through suitable electronic circuitry, whereby the student may be given an audible signal each time a "key" is depressed.

The particular overlay 14 and teaching wheel 12 shown in FIG. 1 are for a spelling game or lesson; accordingly, all 26 letters of the alphabet are inprinted on the overlay as well as the symbol for space; the overlay is also provided with squares labeled "1", "2", and "CLR". These latter three squares, as will become more clear hereinafter, are for selecting the mode of operation of the device and for clearing or erasing an input from the keyboard. Although shown as being physically part of the keyboard matrix switch assembly, they could equally advantageously be separate switches mounted to the body of housing 10 in the same manner as on/off switch 26, since the "1", "2", and "CLR" keys are utilized not merely to input data but rather to control the operation of the apparatus.

Base portion 11 of housing 10 is also provided with two illuminated indicators, the first labeled "Yes" and green in color (designated by reference numeral 32) and the second labeled "No" and red in color (designated by reference numeral 34). A green light appearing at Yes indicator 32 indicates a correct match between the data on the disk associated with the particular image frame then showing through display window 30 and the data manually input by the student by means of the keyboard. A red light appearing at No Indicator 34 is indicative either of no matching frame being present on teaching disk 12 (in the event that the "1" or "2" key has just been depressed) or of an error in the student's input (in the event that the student has attempted to input data from the keyboard corresponding to the image then being displayed).

The described apparatus is designed to be operated in two quite different manners, the first of which being referred to hereinafter as "STUDENT INITIATED," the second being referred to hereinafter as "MACHINE INITIATED."

In the STUDENT INITIATED mode, the student first depresses the "CLR" Key, thereby erasing any data previously manually input via the keyboard, and then enters his question by depressing the corresponding sequence of data keys associated with a particular keyboard overlay. In the embodiment described, the maximum length of such a question or phrase that may be manually input from the keyboard is 8 successive key depressions (in accordance with the indications on the various overlays, each individual key might represent a digit, a number, a letter, a syllable, a word, a phrase, a musical note, or an abstract concept); however the student need not always press a total of 8 keys for each question. After inputting his question (assume for the time being the student enters the letters "CUP"), he then presses either the "1" key or the "2" key. The "1" key causes the "YES" light 32 to light up if and only if all 8 characters encoded in the data area associated with one of the frames on the disk matches the students input exactly, in which case the disk will then stop with the corresponding image frame displayed in window 30. In the case of the example at hand, if one of the visual frames of learning disk 12 is a picture of a cup, the encoded optically read data associated with the frame displaying the cup is the encoded representation of the letters "CUP" followed by five blanks (if the student inputs less than 8 characters, the machine automatically adds blanks to the character string input by the student so that it has a full eight characters to compare); the machine starts to read the 12 data areas on the learning disk, one at a time, comparing each of them for an identical match with the character string input by the student; since there is a matching frame, the machine causes the disk 12 to stop with the frame displaying the image of a cup positioned in front of image display window 30.

If however disk 12 did not bear an image of a cup and the letters "CUP" suitably encoded but only the image of a cupcake and the letters "CUPCAKE" then no exact match would have been located, and after a revolution or so the wheel would stop at a location selected at random with "NO" indicator light 34 illuminated, whereupon the student could depress the "CLR" key and try again, just as before. Alternatively he could treat the image that has just been randomly selected by the apparatus as a MACHINE INITIATED question that the student must answer (described in detail below) or he could repeat the STUDENT INITIATED procedure, this time optionally employing the "2" key which will now be described.

When the "2" key is depressed, the machine's logic compares only so much of the character string that has already been input by the student with the corresponding portion of data encoded on the teaching disk and gives the student the opportunity to experiment by changing the last character input (without first having to clear the entire string) while watching the "YES" and "NO" indicators to see if he has found the next correct character. Thus, if the student were to input just the letter "C" and then press the "2" key, the learning disc 12 would stop at the first image whose name began with the letter "C" (a cup, a chair, a clock). If the student then pushed the "A" key, then again pushed the "2" key, the wheel would turn, stop at a random location and the red "NO" light would come on indicating that the "A" was a bad guess for the second letter and that he should try again. If he then input the letter "H" and again depressed the "2" key, the machine would be comparing for the encoded representations of the first two letters corresponding with each frame with the sequence "CH" accordingly would stop with the picture of a CHAIR and the green "YES" light would again be on.

Since the image of a chair is already behind window 30 and the encoded data corresponding therewith therefore already loaded into the comparison circuit, the green light would stay on for as long as the student correctly continued to spell the word "C-H-A-I-R."

Whenever the red light comes on, the student has the choice of whether again to depress the "2" key to search for a possible different frame on the disk that belongs to the same initial character string as the one that he just input, or he can leave the disk as it is and try to select the next correct letter (or other symbol) associated with the image presently displayed.

If, on the other hand, the student were to press the "CLR" key followed by the "2" key, he would then be using the machine to a MACHINE INITIATED question. Since depressing the "CLR" key has effectively erased any previous manual input, in the "2" mode nothing would then be compared to nothing, the disk would stop at a random location, and the green light would come on and stay on as long as the student then inputs the correct letters in the correct sequence corresponding with the image thus selected and displayed at random.

Depressing the "CLR" key followed by the "1" key also would cause the machine to select a particular frame at random, but this time the red light will stay on until and unless the student has input all eight characters of the character string associated with the image then displayed. (If he is wrong, he may erase his entire input by pressing the "CLR" key and then trying a different eight characters.)

Thus it will be seen that a reiterative form of instruction is taking place. The machine may ask successive questions at random which are each answered correctly by the student (indicated by a green light being illuminated after the correct answer has been input by the student) until finally the student inputs an incorrect answer. The student then may press the "CLR" key and try again (this time the mode "2" key, one character at a time). Alternatively, by using the "1" or "2" key but not preceeded by the "CLR", he can check to see if he remembered a correct answer for a different question (i.e., if by previous experience he knew that "L-A-M-P" was the correct spelling of one of the images on the disc, but he had mistakenly input "LAMP" when "MUSHROOM" was being displayed, he could cause the wheel to turn until the image of the lamp was displayed merely by depressing the "1" key).

Figure 3:
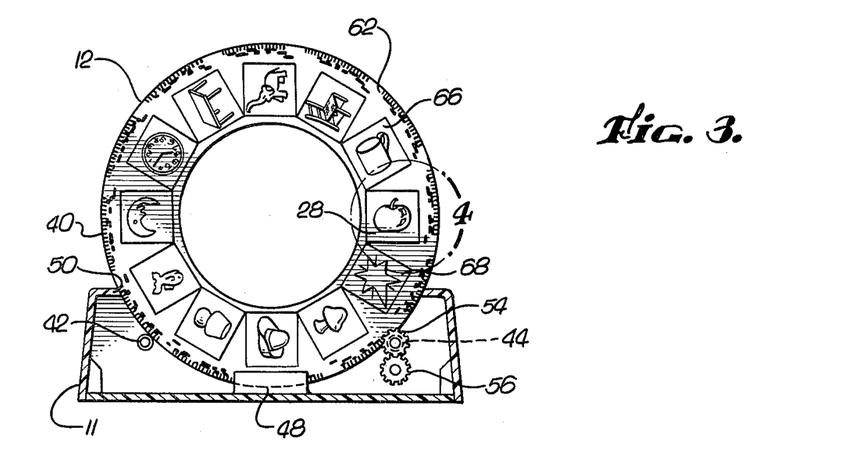
FIG. 3 is another cross-section of the apparatus of FIG. 1 taken along the line 3—3 in FIG. 2, showing in particular an exemplary learning disc and its associated drive mechanism.

Referring now particularly to FIGS. 2 and 3, it may be seen that instruction wheel 12 is supported by its periphery 40 by an idler wheel 42 and by a rubber-surfaced driven wheel 44, and is further supported by a guide-slot 48 at the bottom rear of base 12 and by the edges of a suitably dimensioned slot 50 at the top rear of said base. Driven wheel 44 rotates about a pivot 52 and is provided with a spur gear 54 which mates with a corresponding gear 56 on the output shaft of an electric motor 58. Thus, when electric power is supplied to said electric motor 58, it will be seen that teaching disk 12 will commence to rotate and successive ones of said image frames will appear behind display window 30. Wheel 44 is preferably pulley-shaped, as shown in FIG. 2.

Power for said motor, for the electronic circuits mounted on printed circuit board 24, and for a four-track optical reader 60 is provided by a dry-cell battery 64, which may be a standard 9 volt transistor battery if the current consumption of the various circuit elements is slight, otherwise battery 64 may comprise a plurality of miniature flashlight cells connected together in series arranged to provide the necessary voltage required for the proper operation of the electronic and electrical components. Although in FIGS. 1 and 2, said four-track optical reader 60 is shown facing the portion of teaching disk 12 immediately adjacent to the frame thereof then being displayed through window 30, four-track optical reader 60 could also be mounted at other positions within housing 10 such as (for example) in the vicinity of guide slot 48, the only required change being to displace the angular registration of the data contained about periphery 62 relating to a particular frame 28 by the same angular amount as optical reader is displaced from the position shown in the figures (i.e., 90° if removed from the position shown to a position approximately at the center of guide 48).

Figure 4:
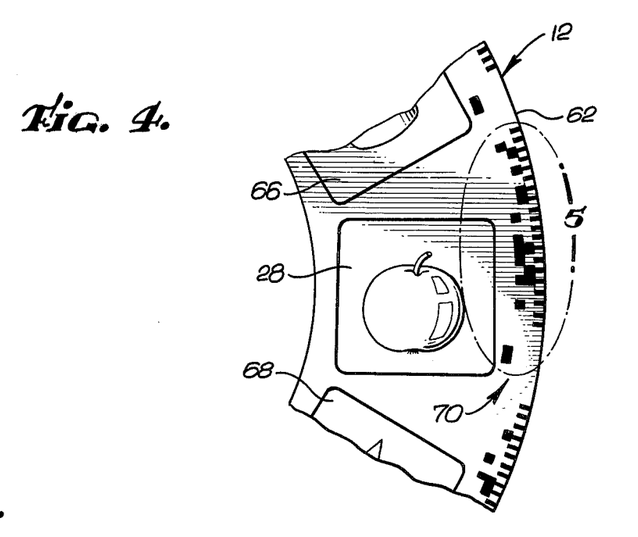
FIG. 4 is a detailed view of a portion of the learning disc shown in FIG. 3 in which the location of the image frame area and the optically read data area at the periphery of the wheel may be more clearly seen.

Referring to the right hand portion of the particular teaching disk 12 as illustrated in FIG. 3, it may be seen that the portion containing the APPLE frame 28, as well as the image frame thereabove 66 displaying a CUP and the image frame therebelow designated 68 and bearing the image of a STAR, is shown in more detail in FIG. 4. In particular, from FIG. 4 it is clear that said teaching wheel contains not only a plurality of image frames (such as the APPLE frame designated with numeral 28) for displaying individual pictorial images, but also a digital data area designated generally by reference numeral 70 located about the outer circumference 62 of said wheel and bearing a pattern of dark and light areas arranged in four adjacent tracks such that they may be read by the four light emitting diode/photo-resister elements of four track optical data reader 60.

For the sake of completeness, the 12 images of the 12 frames for the particular teaching wheel shown in FIGS. 1 and 3 will now be named in a clockwise sequence commencing with the frame designated 28 bearing the depiction of an APPLE, together with the correct spelling of the English words corresponding thereto:

1. APPLE
2. STAR
3. MUSHROOM
4. HAT
5. LAMP
6. FISH
7. MOON
8. CLOCK
9. TABLE
10. ELEPHANT
11. CHAIR
12. CUP

It should be noted that eight successive depressions of the keys of the particular alphabetic keyboard overlay 14 illustrated in FIG. 1 is the maximum required to spell any of the aforelisted English words corresponding to the 12 different illustrated images. Since it is designed to accommodate such an alphabetic overlay for spelling in the English language, keyboard switch matrix 22 must be capable of causing at least 26 different binary codes to be generated, one for each letter of the English alphabet.

From a study of Table 1 appended hereto, which lists the decimal numbers from 0 through 31 and their binary equivalents, it is evident that a five level binary code is adequate for such an application and said Table 1 specifies a particular five digit binary code that may be used to represent the 26 letters of the English alphabet.

Figure 5:
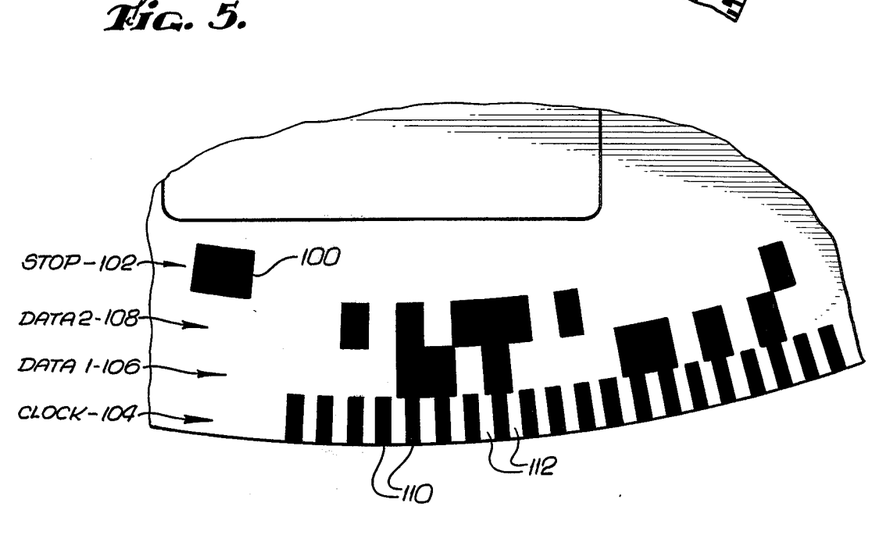
FIG. 5 is a more detailed and enlarged view of the optically readible data area shown in FIG. 4, in which the individual marks spelling out the word "elephant" may be clearly seen.

Accordingly, in the presently preferred embodiment described herein, the data area containing the data related to a particular image frame is designed to accommodate at least 8 digital words (characters), each 5 bits long, giving a total of 40 bits of data per frame. An exemplary arrangement of one such data area containing binary data in optically readable form to be associated with the frame (visible at the top of FIGS. 1 and 3) bearing the image of an elephant is shown in FIG. 5. By referring to Tables 1 and 2, it may be seen that the word "ELEPHANT" may be represented by the binary code depicted in Table 1 as follows:

0010101100001011000001000000010111010100

Since there are 12 frames on one side of the teaching wheel, and 360° in a full circle, there are accordingly 30° about the circumference of the wheel in which to represent the data. Of this 30°, 6° is used to designate a stop mark 100, the function of which will be more clear hereinafter. Stop mark 100 is contained in a "STOP" track 102, the innermost of the four concentric data tracks contained about the periphery 62 of teaching wheel 12. The other optical tracks are CLOCK track 104, Data1 track 106 and Data2 track 108.

REFERRING first to CLOCK track 104, it may be seen that said clock track comprises twenty radially oriented black rectangular clock marks 110 equally spaced about the first 24° of the data area, followed by 6° of guard space. Each of the clock marks 110 defines a separate data bit area on each of the data channels (DATA1 channel 106 and DATA2 channel 108). The blank spaces 112 between adjacent clock marks 110 have no special meaning in and of themselves, but are used only to define the beginning and end of the actual marks.

It will be recalled that optical data reader 60 comprises four light emitting diodes (LED's), each of which has an associated photo-resistor. By illuminating the LED's with a suitable power source (such as a dry cell battery) and by connecting each of the photo-resisters to a constant current source, the ungrounded terminal of each photo-resister will be at a first voltage potential (representing a binary 1) when the light from the corresponding LED is absorbed by a black mark on a corresponding teaching disk data track and at a second voltage potential (representing a binary 0) when the light from the LED is reflected onto the corresponding photo-resister by a white area of the corresponding teaching disk data track. Accordingly, as the 20 clock marks associated with a particular image frame pass successively in front of the LED-photo-resister element positioned in front of CLOCK track 104, there is generated a regular succession of binary 1's and 0's which may serve as clock pulses and which are utilized by the electronic circuit elements shown in FIG. 6 to decode the black and white areas of the DATA1 and DATA2 tracks into two respective data sequences each of 20 bits in length.

Referring again to the particular portion of the four optical tracks illustrated in FIG. 5, and commencing with the portion thereof directly above the particular clock mark bearing designation numeral 106, it may be seen that the DATA1 track represents in encoded binary form the 20 binary digits 00101011000010110000 which (refer to Tables 1 and 2) form the encoded representation of the first four letters of the correct English language spelling for the word elephant, namely "ELEP." Immediately above on data track 2 there is encoded the binary number "01000000010111010100" which is the encoded representation for the second four letters thereof, namely "HANT."

Figure 6:
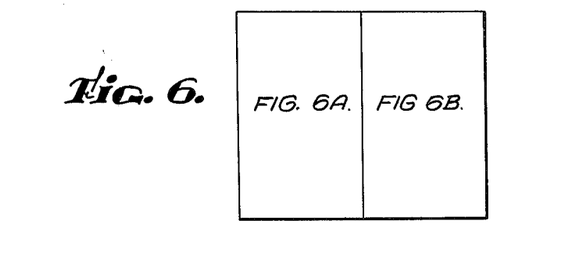
FIG. 6 (comprising a left hand portion FIG. 6A and a right hand portion FIG. 6B, which may be joined together to form a single Figure as indicated) is a functional block diagram of the various digital logic circuits employed in the apparatus of FIG. 1, in which it may be seen how data and control signals flow from one circuit element to another.
Figure 6A:
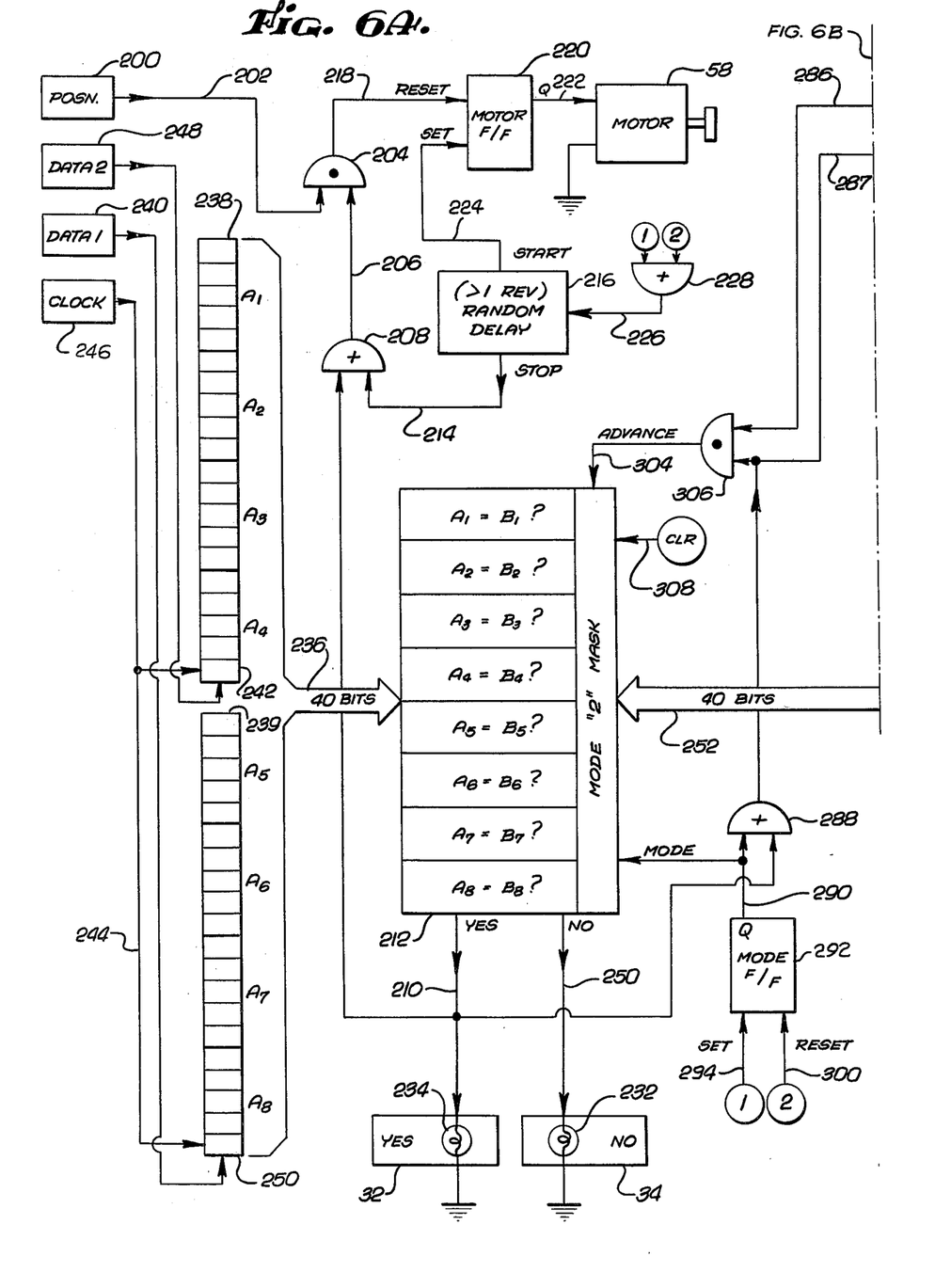
Figure 6B:
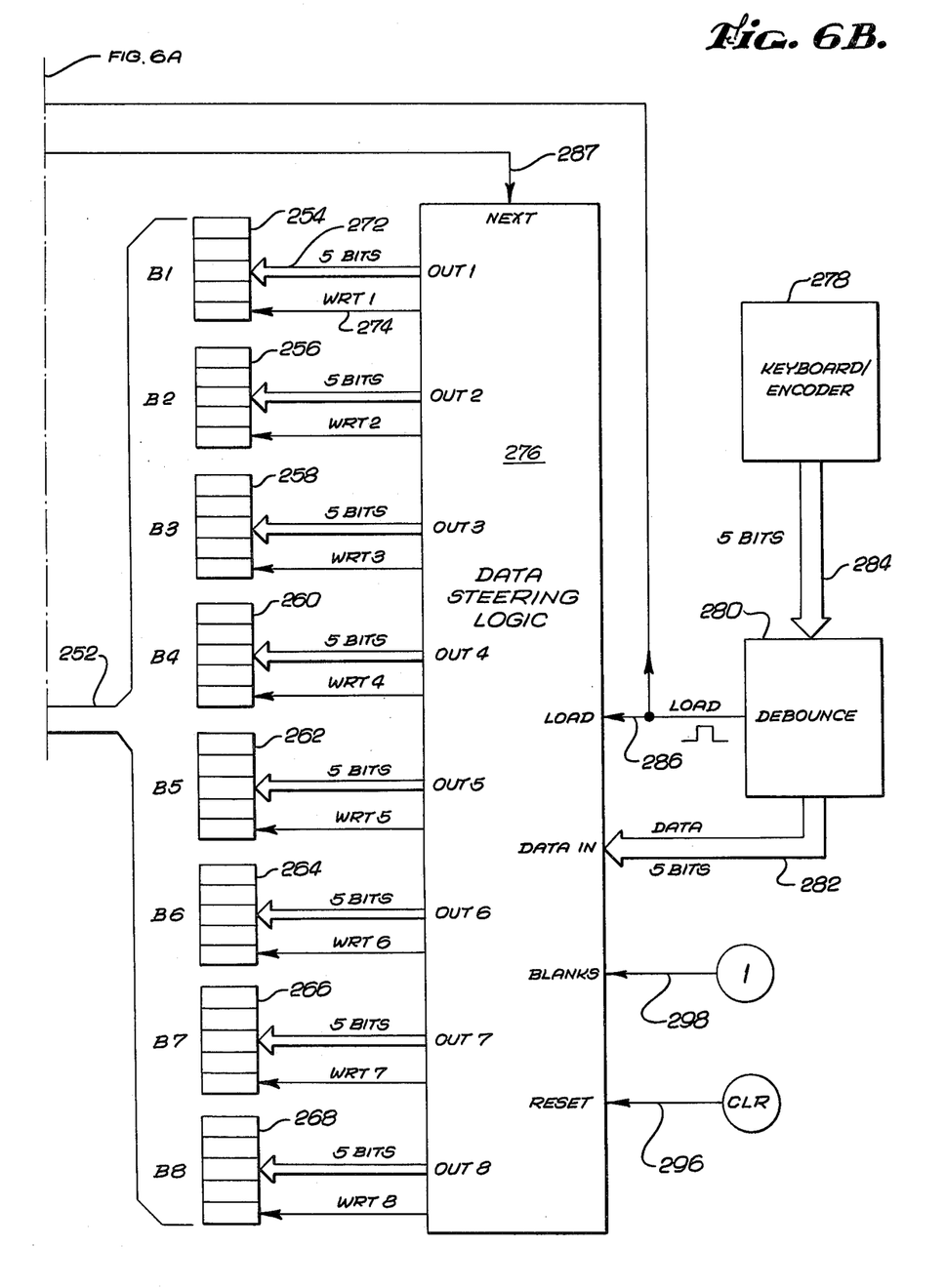

Referring now to FIG. 6, which as may be seen actually comprises two separate Figures, a left hand portion FIG. 6A and a right hand portion FIG. 6B, it may be seen that the various operations performed by the apparatus in accordance with the preferred embodiment herein described may be implemented by electronic circuits such as shift registers, flip-flops, AND-gates, OR-gates, comparison circuits, steering logic circuits, and debouncer circuits and may be readily assembled utilizing commercially available components. (Some or all of the functions performed by the illustrated dedicated hard-wired logic circuits could obviously also be implemented by means of a conventional microprocessor under the control of a stored program.)

Referring specifically to the implementation illustrated in FIGS. 6A and 6B, it may be recalled that optical data reader 60 comprises four LED's and four associated light sensitive resistors connected to a suitable current source to provide a logical "1" digital signal when a black mark is placed in front of the LED/photoresistor and a logical "0" digital signal when a reflective area is placed before said LED/photoresistor. Accordingly, in the upper left hand corner of FIG. 6A, reference numeral 200 designates the optical reader circuit positioned before the STOP track 102 on the learning disk's periphery 62, and the output thereof is designated by reference numeral "202".

A "1" is output by circuit 200 when frame registration mark 100 (or other similar registration mark corresponding to another of the 12 separate visual frames contained on a single side of a learning disk) is directly before the STOP marks' corresponding LED/photoresistor. Otherwise, output line 202 from position reader circuit 200 will be "0".

Said output line 202 goes directly to an AND-gate 204 (shown in the figure in conventional digital logic symbology marked with a dot, ".", an AND-gate being such that its output is a "1" if and only if all inputs are "1"'s; an OR-gate is conventionally marked "+" and is such that its output is a "0" if and only if all inputs are "0".) The other input to AND-gate 204 is the output 206 from OR-gate 208; OR-gate 208 in turn has two inputs, the first being the "YES" output 210 from Comparison circuit 212, and the second input 214 being the STOP output from a Random Time Delay Generator Circuit 216. The output from the first mentioned AND-gate 204 is connected to the RESET input 218 of Motor Flip-Flop 220 which has its Q output 222 driving electric motor 58. When RESET input 218 to Motor Flip-flop 220 goes high, then the Q output 222 thereof goes low and the flow of current is cut off to motor 58. RESET input 218 will go high when both (a) position track reader 200 is directly before a black frame registration mark 100 thereby causing output line 202 to go high, and (b) OR-gate 208 also supplies a "1" to said AND-gate 204. That latter condition will prevail only if (a) the output of the comparison circuit 212 is a YES (that is to say the result of the comparison operation performed by said circuit is positive) or else if (b) the time delay period established by Random Time Delay circuit 216 has elapsed. (It is worth noting at this point that the time interval established by Random Time Delay circuit 216, although random is always sufficiently long to ensure that motor 58 can drive learning disk 12 at least one full revolution.) Said delay circuit 216 has as its second output a START output 224 which is connected to the SET input of Motor Flip-flop 220, said SET input causes the Flip-flop to turn on motor 58 by causing a "1" to appear on Q output 222.

Random Time Delay circuit 216 commences its function (generating a random time interval commencing with a START pulse at its START output and ending with the generation of a STOP signal at its STOP output) in response to a triggering by output 226 from OR-gate 228, the inputs of which are the "1" and the "2" key.

Thus in summary, upon either the "1" key or the "2" key being depressed, motor 58 starts spinning, which in turn causes the learning disk 12 to revolve and such revolution ceases only after Comparison circuit 212 outputs a positive comparison result, or until a random time interval following such key depression has elapsed and stop output line 214 therefrom has gone high (either of which conditions causing second input 206 to AND-gate 204 to go high) and whereupon the wheel will stop with its next position mark opposite track reader 200.

Comparison circuit 212 also has a "NO" output line designated by reference numeral 230, which when high causes a lamp 232 associated with No indicator 34 to be illuminated, Yes output 210 also having an associated YES lamp 234 which is illuminated when the YES output goes high.

Providing a first set of inputs to Comparison circuit 212 is a bus carrying 40 bits of data in parallel (represented symbolically at reference numeral 236) originating from a first 20-bit shift register 238 and a second such register 239.

First register 238 is associated with the DATA2 track 108 and associated LED/photoresistor optical reader circuit 248 which feeds data serially into the least significant bit (LSB) position 242 of said first shift register, each serial shifting of one bit of data into the register being in response to a single clock pulse appearing on CLOCK line 244 originating from CLOCK track 106 on the learning disk's outer edge and generated by CLOCK reader 246, which as mentioned above, will output "1" each and every time a clock mark 106 passes before the LED/photoresistor positioned in front of the CLOCK track 104.

In an identical manner, data contained on DATA1 track 248 is read by DATA1 optical reader circuit 240 into the LSB cell 250 of second serial shift register 239 in response to the same procession of clock pulses appearing on CLOCK line 244. Thus, after the twenty clock marks associated with the data relevant to a single visual frame have passed before CLOCK track reader and associated circuit 246, twenty corresponding bits of data from DATA2 track 108 have been read into first shift register 238 and twenty bits of data from DATA1 track 106 have been read into second 20 bit serial shift register 239, and thus all forty bits of data relevant to the particular visual frame are thus made available via input bus 236 to the aforementioned Comparison circuit 212.

The other data input to Comparison circuit 212 is via a second 40-bit data bus 252, which is visible at the right hand portion of FIG. 6A and also at the left hand of FIG. 6b. Referring now specifically to FIG. 6B, it may be seen that the data entering 40-bit bus 252 originates from eight 5-bit parallel-in/parallel-out storage registers designated in the figure respectively with reference numerals 254, 256, 258, 260, 264, 266 and 268.

Referring specifically to the first such 5-bit storage register (designated 254 in the figure), it may be seen that said register provides the five most significant bits of output to the 40-bit 5-data bus 252 and has a 5-bit input bus designated with reference numeral 272 which reloads said first register 254 with five new bits of data whenever the corresponding WRT1 line (designated 274) is enabled.

The control of the first 5-bit bus 272 and its associated write line 274 is the responsibility of Data Steering Logic circuit 276. Data from Keyboard Encoder circuit 278 is processed by Debounce circuit 280, whereupon it arrives at Data Steering Logic circuit 276 via input data bus 282 in a parallel stream 5 bits wide.

As noted above in connection with the description of matrix switch arrangement 22, it would be possible to provide a keyboard which is self-encoding and wherein depression of a single key results in the appropriate 5 bit output being self-generated, without any further logic circuit being required. More conventionally, such a matrix keyboard is scanned and encoded by a separate multiplex encoding circuit of conventional construction. In either event, Debounce circuit 280 receives at its input port (designated 284) a 5-bit binary word from Key board/Encoder 278 (encoded in accordance with Table 1) whenever one of the keys corresponding to one of the 26 letters of the alphabet is depressed; and receives a different signal (which may, for instance, be "11111") whenever none of the keys of the keyboard are depressed. After Debounce circuit 280 has detected activation of one of the keys on the keyboard after a suitable rest period, and the code corresponding to said key has remained unchanged for a predetermined length of time, a single LOAD pulse is output on LOAD line 286, and Data Steering Logic circuit 276 thereupon loads the debounced data appearing at the input data port 282 into the next available 5-bit data register via (in the case of the first 5-bit register 254) first 5-bit output channel 272; the load pulse (appropriately delayed) on LOAD line 286 being applied to first output write line 274, and the encoded data corresponding to the key just depressed accordingly then loaded into said first register 254.

It will be noted that Data Steering Logic circuit 276 is also provided with a control input labeled "NEXT", to which is connected the output of OR-gate 288, shown near the right-hand margin of FIG. 6A. One of the inputs to said OR-gate is the Q-output 290 of Mode Flip-flop 292, the SET input 294 of which is directly connected to the "1" key. Thus, if the "1" key has been recently depressed, the output of Mode Flip-flop 292 will be high, which in turn causes the output of OR-gate 288 to be high and a "1" applied to the NEXT input to Data Steering Logic circuit 276. This has the effect of causing the Data Steering Logic circuit 276, each time another LOAD pulse is received on LOAD control line 286, to "steer" the data appearing on the input bus 282 to the next available 5-bit register, which should be first register 254, if no other data key has been depressed since the "CLR" key was last utilized, and accordingly the CLR signal is also supplied to Data Steering Logic 276 via RESET input 296. Thus, if eight keys of the keyboard are depressed in succession following activation of the "1" key and the "CLR" key, the encoded representations of those eight key depressions will appear respectively in B-1 register 254, B-2 register 256, etc., in sequence. If they match the corresponding 40 bits contained in first input serial shift register 238 and second input serial shift register 239 and appearing at the input port to Comparison circuit 212, a YES signal will appear on YES output 210 and bulb 234 of YES indicator 32 will be illuminated.

In the event that a student has not entered a full 8 character word but, for instance, only the letters "CUP", then, by depressing the "1" key, which, it will be noted, is also a direct input to Data Steering Logic circuit 276 via the input labeled "BLANKS" and bearing designation numeral 298, the encoded representation for the letters C, U, and P, will be stored, respectively, in the B1 register, the B2 register, and the B3 register, while registers B4 to B8 will each be forced to a "blank" condition, and yes indicator 32 will be illuminated, although at least in the case of the illustrated embodiment, the student will perceive the turning of the teaching disk for a random number of revolutions before it stops again with the visual representation of a cup being displayed behind display window 30.

If the "2" key was the last of the two mode keys to be depressed, it will be noted that the "2" key would activate the RESET terminal 300 of Mode Flip-flop 292, thereby disabling its Q output 290. Accordingly, the output of OR-gate 288 which, it will be recalled, is the signal appearing at the NEXT terminal 287 for Data Steering Logic circuit 276, will be high if and only if the YES output line 210 of Comparison logic 212 is positive. Thus, after the "2" key has been depressed, Data Steering Logic circuit 276 steers each encoded character appearing at its keyboard data input port to the next available 5-bit register only if Comparison logic 212 indicated that the immediately preceding character was correct. Otherwise, the Data Steering Logic circuit continues to load each new character input from the keyboard into the same 5-bit register until the (intermediate result) output 210 of Comparison circuit 212 goes high, thereby implementing the capability to compare (if the "2" was depressed) only those characters stored in first and second serial input registers 238 and 239 which correspond to characters already input by the student, and which are all previously known to be correct with the possible exception of the last character in the character string. Comparison circuit 212 is also connected to the Q-output 290 of Mode Flipflop 292 which, it will be recalled, is high if and only if the "1" key was the last of the two mode keys to be depressed. If the signal on the mode line is high, then Comparison circuit 212 compares the encoded representations at all 8 input characters with all 8 encoded characters from Keyboard Encoder 278. If, on the other hand, the "2" key was the last mode key to be depressed, Comparison circuit 212 will compare only the first character positions, if there has been only one pulse appearing at ADVANCE input 304; two successive pulses appearing at Comparison circuit input 304 subsequent to the depression of "CLR" key cause only the first two character positions to be compared, and so on. Such a stepping function could be, for example, implemented by means of an 8 bit shift register mask, each unshifted "1" bit within the mask forcing a particular (intermediate) comparison at a single character position to YES until corresponding manually input data has been already loaded by data steering logic 276 into the appropriate 5-bit storage register 254, 256, etc., and the mask shifted by one bit. It will be recalled that while in mode 2, Data Steering Logic circuit 276 will only load the next such 5-bit register in sequence, if a match occurred in the present character position. The advance signal at input 304 is generated by AND-gate 306, which has one of its inputs connected to the NEXT terminal 287 of Data Steering Logic 276 and the other to the LOAD CONTROL input 286 to said Data Steering Logic circuit. Thus, comparison circuit 212 effectively counts the number of single character registers 254, 256 etc. already loaded with keyboard data in the "2" mode, and thus ensures that only the corresponding characters in the input serial shift registers are compared therewith. Each time the "CLR" key is depressed, a CLR signal is input to Comparison circuit 212 via CLEAR terminal 308 and the intermediate comparison 8-bit mask re-set to "11111111".

Referring now to FIG. 7, which illustrates an embodiment alternate to that described above, it may be noted that the apparatus of FIG. 7 also is provided with a base 11A, and image display window 30A, YES indicator 32A, NO indicator 34A, and a keyboard overlay frame 18A in which is shown a particular keyboard overlay 14A. Furthermore, base 12A is provided with an on/off switch 26A, and an optical reader element 60A is positioned adjacent to a display window 30A.

Figure 7:
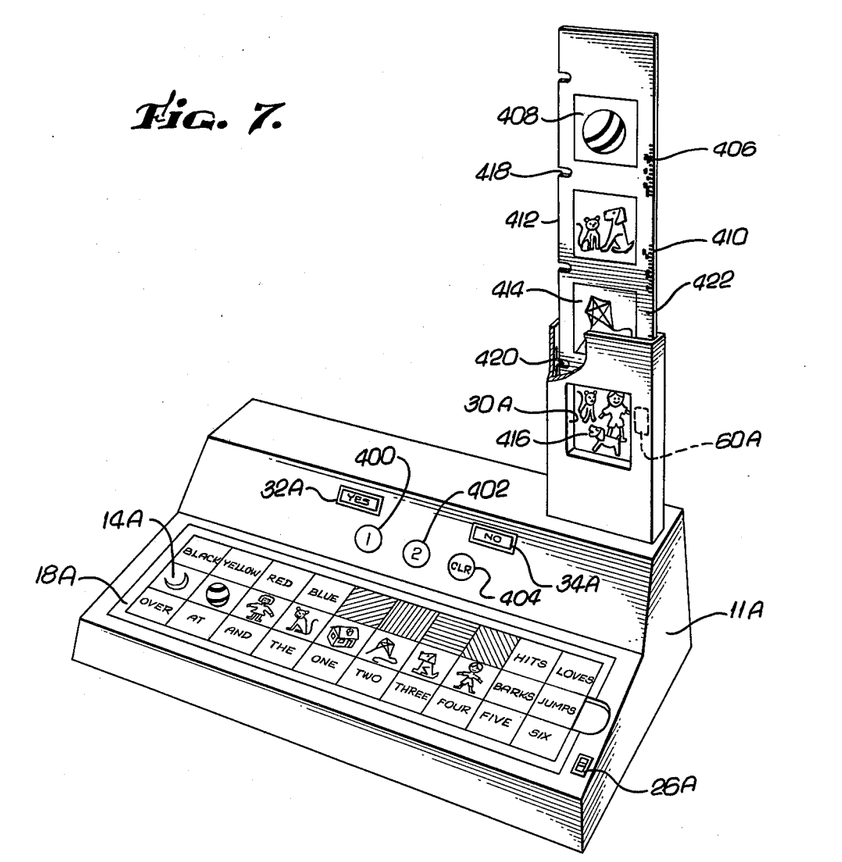
FIG. 7 is a view of an embodiment of a matching-/learning apparatus that, although similar to that illustrated in FIG. 1, utilizes a manually positionable multi-frame learning strip in place of an automatically revolving learning disk, and which additionally shows a keyboard overlay and a set of image frames differing in content from those illustrated in FIG. 1.

Thus far described, the embodiment of FIG. 7 may be seen generally to parallel the presently preferred embodiment of FIG. 1. However, the "1" key 400, "2" key 402, and the "CLR" key 404 are no longer physically part of the keyboard matrix, but are now shown as separate momentary contact pushbutton switches located above the keyboard in the vicinity of YES indicator 32A and NO indicator 34A.

Similarly, keyboard overlay 14A, rather than being provided with the 26 letters of the English alphabet and a symbol for "space", is provided with the following key designations, reading left to right, and starting at the top row: Black, YELLOW, RED, BLUE, a green square, an orange square, a purple square, a gray square, HITS, LOVES; a moon, a ball, a girl, a cat, a house, a kite, a dog, a boy, BARKS, JUMPS; OVER, AT, AND, THE, ONE, TWO, THREE, FOUR, FIVE, SIX.

Using this particular keyboard overlay, it is possible for a child (or other student) seated before the keyboard to compose short phrases or sentences as follows: THE DOG BARKS; THE BOY HITS THE BALL; THE DOG JUMPS OVER THE MOON; THE THREE RED BALLS; THE FOUR BLUE KITES; THE YELLOW MOON; THE BOY AND THE GIRL; THE BOY AND THE TWO GIRLS; THE ORANGE AND PURPLE BALL.

It should be noted that the keyboard comprises 30 keys and, accordingly, the afore described 5-bit digital code is still sufficient to represent any one of the particular key areas, and furthermore, that each of the above sentences or phrases requires 8 or less key depressions. Accordingly, the optical data tracks and clock tracks layouts of FIG. 5 may be utilized without any substantial change, except that the individual marks, instead of being oriented along the radius of a disk, are oriented perpendicular to the edge of a rectangular card 412. At reference numeral 406 of FIG. 7 may be seen the thus-modified optically readable encoded data associated with an image frame illustrating "THE YELLOW AND RED BALL" 408, somewhat above and to the left of data area 406.

Similarly, reference numeral 410 indicates encoded data representing the phrase "THE DOG AND THE CAT," and reference numeral 412 indicates the associated image frame. Also visible on rectangular card 412 is a portion of an image frame depicting "ONE RED KITE" (designated with reference numeral 414) and an image frame 416 visible behind display window 30A depicting the sentence, "THE DOG BARKS AT THE CAT."

It will be noted that the vertical edge of card 412 remote from the vertical edge adjacent encoded data areas 406, 410, etc., is provided with a plurality of notches, one of which is indicated at reference numeral 418. Since the embodiment illustrated in FIG. 7 lacks the electric motor 58 of the FIG. 1 embodiment and its associated drive and position circuitry, there is no need to have an optically readable STOP track on card 412. Rather, there is provided a plurality of notches (such as notch 418) which engage a detent spring 420 when an individual image frame is correctly registered behind window 30A and optical reader 60A is positioned in one of the guard areas 422 provided at either end of an encoded data area.

Figure 7A:
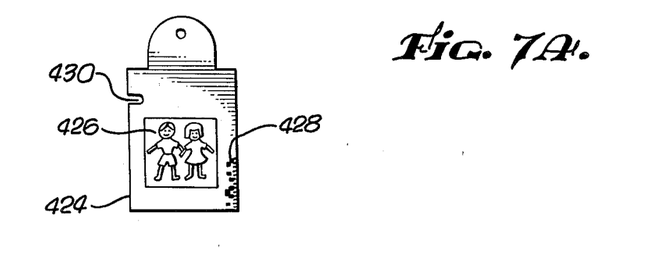
FIG. 7A illustrates a single frame card that may be utilized with the apparatus of FIG. 7, as an alternative to the multi-frame learning strip shown therein.

Although learning card 412 as shown in FIG. 7 has been depicted as a single card bearing at least four distinct visual image frames and four distinct associated encoded data areas, it would clearly be possible to utilize the illustrated apparatus in conjunction with smaller cards such as the card shown in FIG. 7A designated by reference numeral 424, card 424 has but a single image frame 426 (the image illustrated corresponding to the phrase, "THE BOY AND THE GIRL"), together with an associated optically readable data area 428, and a single positioning notch 430.

Since the embodiment of FIGS. 7 and 7A employs the same optically-read data scheme as the FIG. 1 embodiment, the same electronic circuitry as has been previously discussed in connection with FIG. 6 may be employed, the only change being the deletion of position reader circuit 200, Motor 58, Motor Flip-flop 220, Random Time Delay circuit 216, and the associated gates 204, 208 and 228.

It may also be noted that although both the embodiment illustrated in FIG. 1 and that illustrated in FIG. 7 employ optically readable encoded data associated with each of the various image frames, clearly other machine-readable data encoding schemes could be utilized which are functionally equivalent to the illustrated optically readable data scheme.

Among such equivalent data schemes may be mentioned the following: (1) a stripe of magnetic oxide such as is employed on the back of many plastic credit cards; (2) printed bar codes adapted to be read by a light pen such as are employed by supermarket product code systems; (3) magnetically readable printed characters such as are used by banks to record data on checks; (4) a punched matrix of holes and blanks such as are provided on department store price tags to record stock keeping information; (5) edge punched cards such as are used by libraries to maintain circulation records.

As examples of the manner in which the above described apparatus may be utilized to practice a new and useful method of instruction are given the following:

METHOD NUMBER 1 (SPELLING, YOUNG CHILD)

Step 1: Providing the child with a set of visual images representing a predetermined vocabulary of words to be learned;

Step 2: Selecting at random a particular word from said predetermined vocabulary;

Step 3: Focusing the child's attention upon the visual image corresponding to said selected word;

Step 4: Storing a sequence of digital representations of the individual letters comprising the correct spelling of said word into an electronic storage device;

Step 5: Providing the child with a manually operable electronic key board having a plurality of keys, each such key corresponding to a different letter of the alphabet and outputting a different digital representation;

Step 6: Having the child attempt to choose the first letter of the selected word by depressing the particular key on said key board corresponding to said first letter;

Step 7: Comparing the digital representation of the letter chosen by the child in Step 6 with the digital representation of the first letter of said correct spelling stored in Step 4;

Step 8: If the result of the comparison in Step 7 is positive, permitting the child to attempt to choose the next letter of the selected word;

Step 9: If the result of the comparison in Step 7 is negative, signalling to the child that the previous attempt was incorrect and permitting him again to attempt to choose the correct letter;

Step 10: Repeating Steps 7, 8, and 9 until the selected word has been correctly spelled by the child by choosing all the correct letters in their correct sequence.

Step 11: Repeating steps 2 through 10 for as many times as the child's span of attention permits.

METHOD NUMBER 2 (SPELLING, OLDER CHILD)

Step 1: Providing the child with a set of visual images representing a predetermined vocabulary of words to be learned;

Step 2: Selecting at random a particular word from said predetermined vocabulary;

Step 3: Focusing the child's attention upon the visual image corresponding to said selected word;

Step 4: Storing a sequence of digital representations of the individual letters comprising the correct spelling of said word into an electronic storage device;

Step 5: Providing the child with a manually operable electronic key board having a plurality of keys, each such key corresponding to a different letter of the alphabet and outputting a different digital representation;

Step 6: Having the child attempt to choose the first letter of the selected word by depressing the particular key on said key board corresponding to said first letter;

Step 7: Comparing the digital representation of the letter chosen by the child in Step 6 with the digital representation of the first letter of said correct spelling stored in Step 4;

Step 8: If the result of the comparison in Step 7 is positive, permitting the child to attempt to choose the next letter of the selected word;

Step 9: If the result of the comparison in Step 7 is negative, signalling to the child that the previous attempt was incorrect and permitting him again to attempt to choose the correct letter;

Step 10: Repeating Steps 7, 8, and 9 until the selected word has been correctly spelled by the child by choosing all the correct letters in their correct sequence.

Step 11: Repeating steps 2 through 10 until the child is able to spell correctly all the words in said vocabulary.

METHOD NUMBER 3 (MATHEMATICAL RELATIONSHIP)

Step 1: Providing the child with a set of visually perceiveable images representing a predetermined repertoire of arithmetic relationships to be learned;

Step 2: Selecting at random a particular relationship from said predetermined repertoire;

Step 3: Focusing the child's attention upon the image corresponding to said selected relationship;

Step 4: Storing a sequence of digital representations of the individual symbols and digits defining said selected relationship and its associated answer into an electronic storage device;

Step 5: Providing the child with a manually operable electronic key board having a plurality of keys, the different keys corresponding to arithmetic characters including different symbols and digits, each key outputting a different digital representation corresponding to a different character;

Step 6: Having the child attempt to choose the first letter of character defining the selected relationship by depressing the particular key on said key board corresponding to said first character;

Step 7: Comparing the digital representation of the character chosen by the child in Step 6 with the digital representation of the first character of said selected relationship stored in Step 4;

Step 8: If the result of the comparison in Step 7 is positive, permitting the child to attempt to choose the next character of the relationship;

Step 9: If the result of the comparison in Step 7 is negative, signalling to the child that the previous attempt was incorrect and permitting him again to attempt to choose the correct character;

Step 10: Repeating Steps 7, 8, and 9 until the selected relationship has been correctly specified by the child by choosing all such characters in their correct sequence;

Step 11: Having the child attempt to choose the first digit of the correct answer by depressing the particular key on said key board corresponding to said first digit;

Step 12: Comparing the digital representation of the digit chosen by the child in Step 6 with the digital representation of the first digit of said correct answer stored in Step 4;

Step 13: If the result of the comparison in Step 12 is positive, permitting the child to attempt to choose the next digit of the correct answer to the selected relationship;

Step 14: If the result of the comparison in Step 7 is negative, signalling to the child that the previous attempt was incorrect and permitting him again to attempt to choose the correct digit; and Step 15: Repeating Steps 12, 13, and 14 until the correct answer to the selected relationship has been correctly input by the child by choosing all the correct digits in their correct sequence.

Thus, there has been illustrated and described in detail a presently preferred embodiment of game apparatus and method which is believed to fulfill all of the objects and advantages sought therefor. It should be understood that many changes, modifications, variations, and other uses and applications of the described apparatus will become apparent to those skilled in the art after considering this specification and the accompanying drawings. Therefore, any and all such changes, modifications, variations, and other uses and applications which do not depart from the nature and spirit of the invention are deemed to be covered by the invention which is limited only by the following claims.

TABLE 1

| BINARY | DEC. | ALPHA |
| --- | --- | --- |
| 00000 | 0 | |
| 00001 | 1 | A |
| 00010 | 2 | B |
| 00011 | 3 | C |
| 00100 | 4 | D |
| 00101 | 5 | E |
| 00110 | 6 | F |
| 00111 | 7 | G |
| 01000 | 8 | H |
| 01001 | 9 | I |
| 01010 | 10 | J |
| 01011 | 11 | K |
| 01100 | 12 | L |
| 01101 | 13 | M |
| 01110 | 14 | N |
| 01111 | 15 | O |
| 10000 | 16 | P |
| 10001 | 17 | Q |
| 10010 | 18 | R |
| 10011 | 19 | S |
| 10100 | 20 | T |
| 10101 | 21 | U |
| 10110 | 22 | V |
| 10111 | 23 | W |
| 11000 | 24 | X |
| 11001 | 25 | Y |

TABLE 1-continued

| BINARY | DEC. | ALPHA |
| --- | --- | --- |
| 11010 | 26 | Z |
| 11011 | 27 | * |
| 11100 | 28 | * |
| 11101 | 29 | * |
| 11110 | 30 | * |
| 11111 | 31 | ** |

* Not required for English
** Not available

TABLE II

| BINARY | ALPHA |
| --- | --- |
| 00101 | E |
| 01100 | L |
| 00101 | E |
| 10000 | P |
| 01000 | H |
| 00001 | A |
| 01110 | N |
| 10100 | T |

What is claimed is:

1. An electronic matching/learning apparatus comprising:
   (a) a housing;
   (b) a keyboard comprising a plurality of manually operable keys disposed in a generally planar array supported by an upper surface of said housing, said keyboard including means for indicating to the student the significance of each of said keys;
   (c) a plurality of lesson modules, each having an image frame area containing a two-dimensional visually perceivable image and an associated data area containing data related to said image in machine readable digital format;
   (d) means for holding a selected one of said image frame areas in a generally fixed position relative to said keyboard and displaying its associated image to a student positioned before said keyboard;
   (e) means for translating a sequence of data manually input in the form of a sequence of key strokes, each such stroke corresponding to the single actuation of a single key from said keyboard into a first digital phrase, and storing said first digital phrase in a first electronic digital storage register, each different combination of key strokes resulting in a different digital phrase;
   (f) means for reading the data contained in the data area related to said selected image frame area, translating said data into a second digital phrase, and storing said second digital phrase in a second electronic digital storage register;
   (g) means for comparing said first digital phrase stored in said first electronic digital storage register with said second digital phrase stored in said second electronic digital storage register and for comparing a succession of such second digital phrases derived from a corresponding succession of such lesson module data areas until a positive comparison is obtained; and
   (h) means for informing said student whether the result of such comparison is positive or negative.

2. A method for the teaching of arithmetic to a child comprising the steps of:
   Step 1: Providing the child with a set of visually perceivable images representing a predetermined repertoire of arithmetic relationships to be learned;

Step 2: Selecting at random a particular relationship from said predetermined repertoire;

Step 3: Focusing the child's attention upon the image corresponding to said selected relationship;

Step 4: Storing a sequence of digital representations of the individual symbols and digits defining said selected relationship and its associated answer read from a data area associated with said image containing data related thereto in machine readable digital format into an electronic storage device;

Step 5: Providing the child with a manually operable electronic keyboard having a plurality of keys, the different keys corresponding to arithmetic characters including different symbols and digits, each key outputting a different digital representation corresponding to a different character;

Step 6: Having the child attempt to choose the first letter character defining the selected relationship by depressing the particular key on said key board corresponding to said first character;

Step 7: Comparing the digital representation of the character just chosen by the child with the digital representation of the corresponding character of said selected relationship stored in Step 4;

Step 8: If the result of the comparison in Step 7 is positive, permitting the child to attempt to choose the next character of the relationship;

Step 9: If the result of the comparison in Step 7 is negative, signalling to the child that the previous attempt was incorrect and permitting him again to attempt to choose the correct character;

Step 10: Repeating Steps 7, 8, and 9 until the selected relationship has been correctly specified by the child by choosing all such characters in their correct sequence;

Step 11: Having the child attempt to choose the first digit of the correct answer by depressing the particular key on said keyboard corresponding to said first digit;

Step 12: Comparing the digital representation of the digit just chosen by the child with the digital representation of the corresponding digit of said correct answer stored in Step 4;

Step 13: If the result of the comparison in Step 12 is positive, permitting the child to attempt to choose the next digit of the correct answer to the selected relationship;

Step 14: If the result of the comparison in Step 7 is negative, signalling to the child that the previous attempt was incorrect and permitting him again to attempt to choose the correct digit; and Step 15: Repeating Steps 12, 13, and 14 until the correct answer to the selected relationship has been correctly input by the child by choosing all the correct digits in their correct sequence.

3. An electronic matching/learning apparatus comprising:

a housing;

a keyboard comprising a plurality of manually operable keys disposed in a generally planar array supported by an upper surface of said housing, said keyboard including means for indicating to the student the significance of each of said keys;

a plurality of lesson modules, each having an image frame area containing a two-dimensional visually perceivable image and an associated data area containing data related to said image in machine readable digital format;

means for holding a selected one of said image frame areas in a generally fixed position relative to said keyboard and for displaying its associated image to a student positioned before said keyboard;

means for translating a sequence of data manually input in the form of a sequence of key strokes, each such stroke corresponding to the single actuation of a single key from said keyboard into a first digital phrase, and storing said first digital phrase in a first electronic digital storage register, each different combination of key strokes resulting in a different digital phrase;

means for reading the data contained in the data area related to said selected image frame area, translating said data into a second digital phrase, and storing said second digital phrase in a second electronic digital storage register;

means for comparing said first digital phrase stored in said first electronic digital storage register with said second digital phrase stored in said second electronic digital storage register;

means for informing said student whether the result of such comparison is positive or negative, wherein:

at least two of said plurality of lesson modules are contained on a unitary learning card, and wherein said housing further comprises:

motive means for moving said learning card from a first position wherein a first frame contained on said learning card is the selected frame area held in a fixed position relative to said keyboard to a second position wherein a second frame area is the selected frame area thus held, wherein said learning card is in the shape of a disc and wherein said associated data areas are located about the periphery of the disc.

4. The apparatus of claim 3, wherein said means for reading data is an optical data reader located in a fixed position relative to said housing in the vicinity of said disc periphery, whereby rotation of said disc by said motive means causes the data in said data areas to move past said optical data reader and thereby be read.

* * * * *